United States Patent [19]
Linnepe et al.

[11] Patent Number: 5,314,157
[45] Date of Patent: May 24, 1994

[54] ELONGATABLE SUPPORT

[76] Inventors: Kurt Linnepe; Marcus Linnepe, both of Burgstr. 6, W-5820 Gevelsberg, Fed. Rep. of Germany

[21] Appl. No.: 872,714
[22] Filed: Apr. 21, 1992

[30] Foreign Application Priority Data

Sep. 26, 1991 [DE] Fed. Rep. of Germany ....... 4132035

[51] Int. Cl.$^5$ ................................................. A47F 5/00
[52] U.S. Cl. ................................. 248/354.1; 254/12; 254/95
[58] Field of Search .................. 248/161, 354.1, 354.4, 248/354.3, 404, 407, 409, 411, 412; 254/95, 12

[56] References Cited

U.S. PATENT DOCUMENTS

| | | | |
|---|---|---|---|
| 788,045 | 4/1905 | Hammond | 254/12 |
| 1,142,452 | 6/1915 | Oliver | 254/12 |
| 1,420,556 | 6/1922 | Klasing | 254/95 |
| 1,648,817 | 11/1927 | Maerk | 254/95 |
| 2,153,722 | 4/1939 | Loughmiller . | |
| 2,918,257 | 12/1959 | Hahn . | |
| 3,589,757 | 6/1971 | Mooney | 248/354.1 X |
| 3,930,645 | 1/1976 | Anderson | 248/354.1 X |
| 4,083,530 | 4/1978 | Linnepe . | |

FOREIGN PATENT DOCUMENTS

| | | | |
|---|---|---|---|
| 188087 | 2/1956 | Austria | 248/161 |
| 1257491 | 12/1967 | Fed. Rep. of Germany . | |
| 2409012 | 11/1975 | Fed. Rep. of Germany . | |
| 2630446 | 7/1976 | Fed. Rep. of Germany . | |

*Primary Examiner*—J. Franklin Foss
*Attorney, Agent, or Firm*—Herbert Dubno; Yuri Kateshov

[57] ABSTRACT

A telescoping support has at its actuating head at which a roller engages a bar which emerges from the outer tube, a sleeve-like extension provided with a pawl which can engage the bar in a sleeve-locking manner under load to prevent spontaneous contraction of the support upon rupture of the roller.

13 Claims, 1 Drawing Sheet

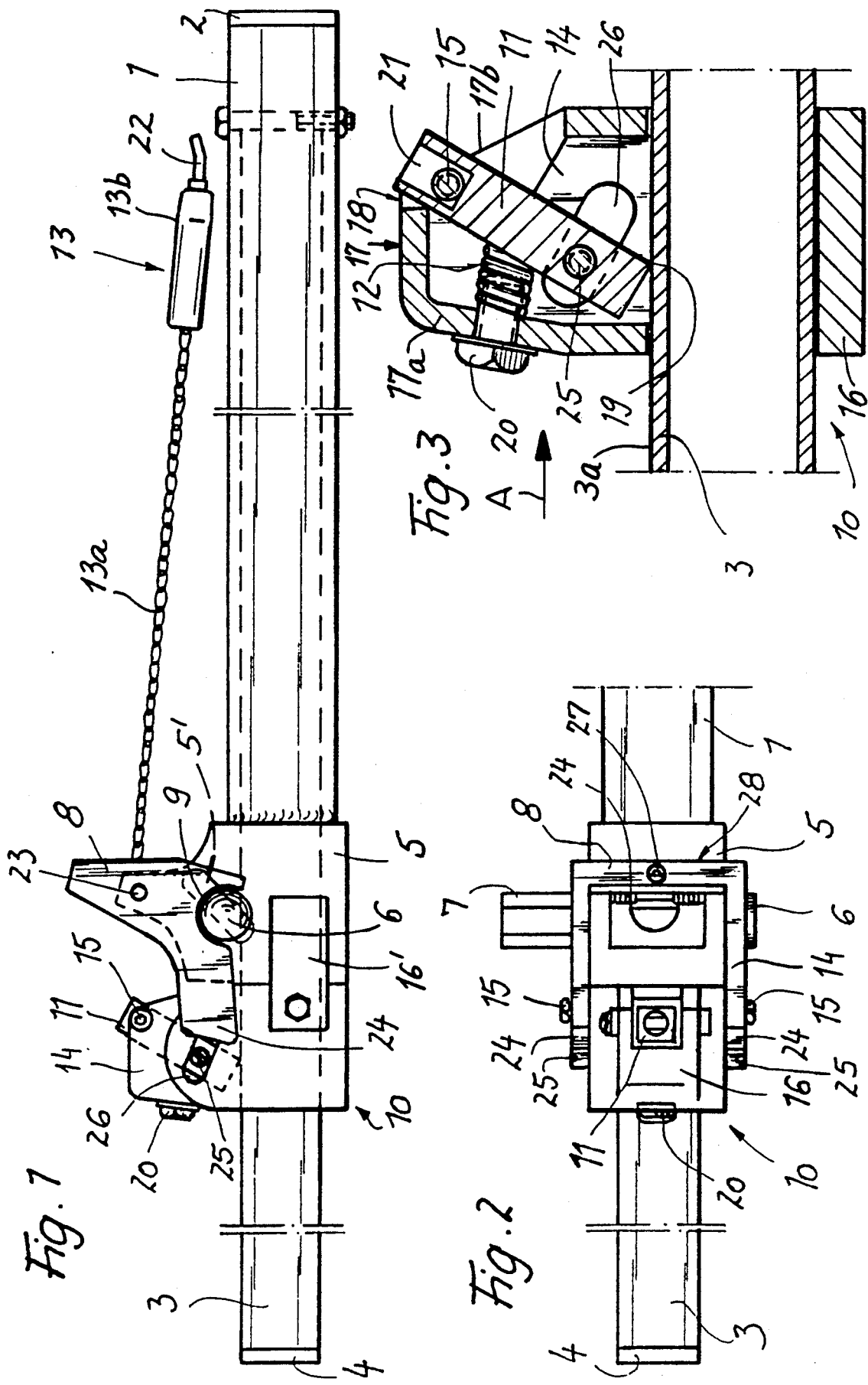

ELONGATABLE SUPPORT

CROSS REFERENCE TO RELATED APPLICATION

This application is related to our copending commonly assigned application Ser. No. 07/872,711 (U.S. Pat. No. 5,186,429 issued Feb. 16, 1993) corresponding to German application P 41 32 070.0 filed Sep. 26, 1991 now U.S. Pat. No. 5,186,429.

1. Field of the Invention

Our present invention relates to an elongatable support of the type in which a pair of telescoping members, including a support tube and a bar, usually a hollow bar, can be locked by wedging action of a roller at a head of the tube against contraction of the support load and the support can be extended by rotation of the roller.

2. Background of the Invention

In German patent document DE 26 30 446 C2 and U.S. Pat. No. 4,083,530, there are described elongatable supports which can be used as vehicle jacks, jacks in structural supports, braces between opposite sides of a trench coffering, and in other applications in which one end of the support is braced and the other end is pressed against a structure, device, apparatus or thing to be supported.

The basic construction of such a support is that of a telescoping tube system in which a bar, usually a tube or hollow bar, is telescopingly received in a support tube so that it can extend from the support tube at a mouth thereof. At the mouth of this support tube, an actuating head can be provided in which a drive roller which is externally actuatable can be received. When rotated, this roller can cause the bar to telescopingly extend from the support tube or can allow the construction of the support by reentry of the bar into the support tube.

The drive roller is so disposed on the head that it is self-blockingly wedged between a running surface of the bar and inclined surface of the head so that the support will not contract under load.

Spring means are provided on the head to bias the drive roller into its wedged position and the roller can be provided with teeth where it engages the surface of the bar.

The actuating head is also formed with a guide element which can have guide slits extending generally transversely to the direction of elongation of the support and in which end portions of the drive roller can be guided parallel to one another.

Since the drive roller is pressed by spring force between the mutually-converging running surfaces of the actuating head and the bar, elongation of the support by drawing the bar out of the support tube is possible while contraction under load can only take place when the drive roller is lifted from the running surface of the bar against the spring force. Under load, however, the support can be extended by rotation of the drive roller with the application of sufficient torque. Upon rotation of the drive roller, the teeth thereof bite into the running surface of the bar to improve the form fitting engagement between the bar and the drive roller.

Such supports have been found to be successful in practice. However, there is always a danger that the drive roller will rupture or that the support for the drive roller will fail, thereby creating a dangerous situation because the support can then immediately collapse spontaneously under load.

OBJECTS OF THE INVENTION

It is, therefore, the principal object of the present invention to provide a support of the type described which has greater reliability against failure under load and, especially cannot spontaneously collapse or contract even upon breakage of the drive roller.

Another object of our invention is to provide a telescopingly-elongatable support which will be free from the drawback of the earlier support while retaining all of the advantages thereof.

SUMMARY OF THE INVENTION

These objects are attained, according to the invention, by providing the actuating head of the support with a region projecting beyond the mouth of the support tube and which can engage around the bar and can carry a clamping member which is pivotally or rotationally mounted thereon, which is positioned to be self-locking under load against a running surface of the bar and which is spring-loaded in the direction of clamping, this clamping member being readily shiftable into a release position by a handle of the device from its clamping position.

More particularly, an elongatable support in accordance with the present invention can comprise:

an outer tube having a mouth;

a bar telescopingly slidable into and out of the tube at the mouth; and an actuating head on the outer tube at the mouth, the actuating head being formed with:

a housing, a guide element pivotally mounted on the housing and having a pair of mutually parallel guide slots on opposite sides thereof and inclined to a surface of the bar, a drive roller having opposite ends guided in the slots and adapted to be wedged selfblockingly against the surface of the bar under a load applied to the support, the roller being provided with external means for rotating same and being formed with teeth on a surface of the drive roller engageable with the surface of the bar, spring means acting upon the drive roller for urging the drive roller into engagement with the surface of the bar, the housing having a portion extending beyond the mouth and surrounding the bar proximal to the mouth, a clamping member swingably mounted on the portion of the housing and self-lockingly clamped against the bar under load upon swinging of the member in one sense, at least one spring biasing the clamping member in the one sense, and a release mechanism on the housing including a manually actuatable handle operatively coupled with the member for displacing the member in an opposite sense to disengage the member from the bar.

This arrangement ensures that even upon breakage of the drive roller with the elongatable support under load, an autogenous contraction of the bar into the support tube is precluded.

The bar is, on the contrary, held in its supporting position so that no dangerous situation can arise. In normal utilization of the support when the latter is not under load, elongation can be effected simply by pulling the bar out of the support tube manually, the clamping member being ineffective although it is spring-biased against the bar.

Under contraction of the support in an unloaded or even in a loaded state utilizing rotation of the drive roller, the clamping member can be swung into its release position with the aid of the handle so that the bar can be shifted into the support tube.

The clamping member can be formed as an eccentric or a shiftable or swingable wedge if desired. However, preferred is a swingable-wedge action formed by a pawl.

According to a feature of the invention, the pawl is swingably mounted in a pair of lateral cheeks or flanges of a sleeve portion of the housing extending beyond the mouth of the support tube and surrounding the bar.

The flanges may be bridged to form a capped enclosure having a slot-like opening through which an end of the pawl can project, this end of the pawl having a recess or socket adapted to receive a rod-like projection of the handle which can be removably inserted into the pawl end to release the latter.

The projecting sleeve portion can be formed as a piece separate from the remainder of the housing and can be connected thereto, e.g. by bolting or welding, or this sleeve can be formed in a single piece with the housing. If it is a separate piece, it can be retrofitted to the housing of the actuating head of the elongatable prop described in U.S. Pat. No. 4,083,530 and DE 26 30 446 mentioned previously.

In a preferred embodiment of the invention, the pawl has a rectangular (preferably square) cross section and an edge at its end opposite that which is engageable by the handle, adapted to bite into the running surface of the bar. The handle itself can have a grip from which the rod-forming projection extends and can be connected by a chain or the like to the actuating head or another part thereof.

In a preferred embodiment of the invention, the guide element is a fork which is pivotally mounted on the housing on an axis which is parallel to a traverse of the fork and at a right angle to the tube axis. The fork can be provided with the guide slits in which the opposite ends of the drive roller are engaged. The shanks of the fork can be extended on opposite sides of the housing to allow them to engage pin-like abutments projecting laterally from the pawl through slots in the aforementioned flanges so that, upon angular displacement of the fork to release the wedge action of the drive roller, the pawl will simultaneously swing into its disengaged position.

In this manner it is possible simply by actuating the guide element to release both the drive roller and the clamping pawl from engagement with corresponding surfaces of the bar.

The guide element can also releasably receive the handle so that the latter can be actuated like a lever to release this element. Advantageously, a plug action is provided for the handle in the guide element. For this purpose, the traverse of the fork can have a recess (blind bore or the like) in which the free end of the rod-shaped handle is engageable.

When the handle is no longer engaged by the operator or user, it can slide automatically from the recess or be ejected from the recess by an ejection spring or the like so that the danger of involuntary actuation is avoided.

BRIEF DESCRIPTION OF THE DRAWING

The above and other objects, features and advantages of the present invention will become more readily apparent from the following description, reference being made to the accompanying drawing in which:

FIG. 1 is a side elevational view of an elongatable support according to the invention showing the support in a horizontal orientation;

FIG. 2 is a plan view of the head of the support; and

FIG. 3 is a cross section through the head drawn to a larger scale.

SPECIFIC DESCRIPTION

The elongatable support shown in the drawing comprises a support tube 1 having a foot plate 2 at one end which is adapted to be braced against one structure and a hollow bar 3 which is telescopingly received in the tube 1 and also can be provided with a foot plate 4 adapted to bear against another structure with the force applied to the support between these structures being referred to as the load. The support tube 1 and the bar 3 are profiled in cross section, i.e. are noncircular or polygonal, preferably being of square cross section.

At a mouth of the tube 1 from which the bar 3 emerges, an actuating head 5 is provided in which a drive roller 6 is received. The drive roller 6 can be rotated by means external of the housing of the head 5, e.g. via a crank, hand wheel or wrench, which can be engaged with a polygonal, e.g. hexagonal drive member 7 projecting from the roller 6. The roller 6 is positioned to be self-locking under load between a running surface of the bar 3 and an inclined surface of the head 5 formed by slots 5′ in the housing thereof. In addition, the drive roller 6 is spring-loaded into its wedged position between these surfaces.

The principles of such roller locking are set out in U.S. Pat. No. 4,083,530.

Along its surface engageable with the bar 3, the roller 6 is toothed so that the teeth can dig into the surface of the bar 3 when the roller is clamped under load against the surfaces of the bar and the head 5.

The guide element 8 is swingably mounted on the head 5 and has, at its opposite sides, guide slots 9 which extend generally transversely to the longitudinal dimension of the support and in which the ends of the drive roller 6 are received for parallel movement.

The head 5 is provided with an extension or projection 10 in the form of a sleeve which extends beyond the support tube 1 to the left in FIGS. 1 and 2 to surround the bar 3 close to the end of the support tube 1.

On this projection 10, a clamping pawl 11 is swingably or rotatably mounted and is so oriented that under the action of a load (arrow A) it self-blockingly engages the surface 3a of the bar 3 and prevents contraction of the support.

The pawl 11 is biased by a spring 12 in the counterclockwise sense about its pintle 15 into the locking position. Spring 12 is a coil spring mounted on a bolt 20.

The pawl 11 can be swung in the clockwise sense (FIG. 3) to release it by a handle 13 connected by a chain 13a to the actuating head 5. The handle 13 has a grip 13b and a rod-like projection 22 which could fit within a recess or blind bore 21 of the pawl 11. Using the handle 13, therefore, the pawl 11 can be released from the bar 3.

A pair of lateral flanges 14 project upwardly from the sleeve portion 10 and carry the axle 15 on which the pawl 11 is swingable. These flanges are connected by a wall 17a on which the bolt 20 and spring 12 are mounted and which forms a cap-like enclosure 17 having a slot 17b through which the pawl 11 projects. The sleeve configuration of the projection 10 can be seen at 16 and can be connected to the housing of the head by a plate 16' if, for example, the head of the type shown in U.S. Pat. No. 4,083,530 is to be retrofitted with the sleeve 16 and the pawl 11. The setscrew 20 can be used to prestress the spring 12 which is biased against the pawl 11.

The pawl 11 is a pin of square cross section, an end edge 19 of which can bite into the surface 3a of the bar to wedge against the latter under load.

The guide element 8 of the actuating head is a fork which is swingable about an axis 23 on the head 5 and parallel to the fork traverse 18.

The guide slits 9 are formed in the shanks of the fork and a spring means 24, e.g. a torsion spring, can spring-load the drive roller 6 to the right (FIG. 1) via the actuating element 8.

As can be seen from FIG. 1, the shanks of the fork can be extended at 24 so that they can engage a pair of pin-like abutments 25 projecting laterally from the pawl 11 through slots 26 in the flanges 14 upon rotation of the fork in a sense (FIG. 1) to as disengage the roller 6 from the bar 3, the pawl 11 is swung in the clockwise sense into a disengaged position.

The handle 13 can also engage in a recess or socket 27 of the traverse 28 to form an actuating lever for the fork enabling it to be swung in the clockwise sense.

The device is not, of course, limited to the specific structure illustrated but encompasses as well all modifications within the spirit and scope of the appended claims and the invention is deemed to include all of the elements of novelty described individually and in combination.

We claim:

1. An elongatable support, comprising:
   an outer tube having a mouth;
   a bar telescopingly slidable into and out of said tube at said mouth; and
   an actuating head on said outer tube at said mouth, said actuating head being formed with:
   a housing,
   a guide element pivotally mounted on said housing and having a pair of mutually parallel guide slots on opposite sides thereof and inclined to a surface of said bar,
   a drive roller having opposite ends guided in said slots and adapted to be wedged selfblockingly against said surface of said bar under a load applied to said support, said roller being provided with external means for rotating same and being formed with teeth on a surface of said drive roller engageable with said surface of said bar,
   spring means acting upon said drive roller for urging said drive roller into engagement with said surface of said bar, said housing having a portion extending beyond said mouth and comprising:
   a sleeve formed with a pair of lateral flanges and surrounding said bar proximal to said mouth, said flanges being bridged to form a capped enclosure provided with a slotlike opening and with a surface turned toward said tube, and
   an axle pin spanning said flanges,
   a clamping pawl swingably or shiftably mounted on said axle pin by one end extending through said slotlike opening and self-lockingly clamped against said bar by another end opposite said one end under load upon swinging of said pawl in one sense,
   at least one spring biasing said pawl in said one sense and being supported under prestress by said surface of said enclosure, and
   a release mechanism on said housing including a manually actuatable handle engageable operatively coupled with said one end of said pawl for displacing said pawl in an opposite sense to disengage said pawl from said bar.

2. The elongatable support defined in claim 1 wherein said clamping member is formed as an eccentric on said portion of said housing.

3. The elongatable support defined in claim 1 wherein said clamping member is formed as a shiftable or swingable wedge member.

4. The elongatable support defined in claim 1 wherein said pawl is a rectangular-cross section pin having an end-face edge parallel to said surface of said bar and spring-biased thereagainst, said pawl being so inclined to said surface of said bar that a load on the elongatable support wedges said pawl against said surface of said bar.

5. The elongatable support defined in claim 1 wherein said other end of said pawl is formed with a recess configured to receive a rod-shaped portion of said handle.

6. The elongatable support defined in claim 1 wherein said guide element is a fork rotatable on said housing about an axis perpendicular to an axis of said tube and parallel to a traverse of the fork, said guide slots being formed in shanks of said fork and said spring means engaging said guide element.

7. The elongatable support defined in claim 1 wherein said shanks extend beyond said mouth of said tube, said pawl is swingable about a pawl axis parallel to the axis about which said fork is rotatable on said housing, said pawl has pin-like formations projecting laterally therefrom through slots formed in said flanges into a path of ends of said shanks and engageable thereby upon rotation of said fork to release said pawl from said bar.

8. The elongatable support defined in claim 1 wherein said handle is releasably engageable in said fork to form a lever for rotating said fork.

9. The elongatable support defined in claim 1 wherein said pawl is of square cross section.

10. The elongatable support defined in claim 1 wherein said handle and said form have a plug connection.

11. The elongatable support defined in claim 1 wherein said one end of said pawl formed with a recess confined to receive a rod-shaped portion of said handle.

12. An elongatable support, comprising:
    an outer tube having a mouth;
    a bar telescopingly slidable into and out of said tube at said mouth; and
    an actuating head on said outer tube at said mouth, said actuating head being formed with:
    a housing having a portion extending beyond said mouth and surrounding said bar proximal to said mouth,
    a guide element pivotally mounted on said housing about an axis perpendicular to an axis of said tube and parallel to a traverse of the fork and provided with a pair of shanks, said shanks extending beyond said mouth of said tube and being provided with a pair of mutually parallel guide slots formed on opposite sides of said fork and inclined to the surface of said bar;

a drive roller having opposite ends guided in said slots and adapted to be wedged selfblockingly against said surface of said bar under a load applied to said support, said roller being provided with external means for rotating same and being formed with teeth on a surface of said drive roller engageable with said surface of said bar, spring means engaging said guide element and acting upon said drive roller for urging said drive roller into engagement with said surface of said bar, and a clamping pawl swingably mounted on said portion of said housing about a pawl axis parallel to the axis about which said fork is rotatable and self-lockingly clamped against said bar under load upon swinging of said guide fork in one sense, said pawl provided with flanges and having pin-like formations projecting laterally therefrom through slots formed in said flanges into a path of ends of said shanks, at least one spring biasing said pawl in said one sense, and a release mechanism on said housing including a manually actuatable handle operatively coupled with said pawl and said guide fork for engaging said pin-like formations with said shanks upon displacing said guide fork in an opposite sense to disengage said pawl from said bar.

13. The elongatable support defined in claim 12 wherein said handle is releasably engageable in said fork to form a layer for rotating said fork.

* * * * *